Feb. 8, 1944.    F. W. BUBB    2,341,422
PHOTOELASTIC INSTRUMENT
Filed July 9, 1941    2 Sheets-Sheet 1

INVENTOR
Frank W. Bubb
BY
Ray M. Eilers
ATTORNEY

Patented Feb. 8, 1944

2,341,422

UNITED STATES PATENT OFFICE 2,341,422

PHOTOELASTIC INSTRUMENT

Frank W. Bubb, Webster Groves, Mo., assignor to Mississippi Valley Research Laboratories, Inc., St. Louis, Mo., a corporation of Missouri Application July 9, 1941, Serial No. 401,610

9 Claims. (Cl. 88—14)

This invention relates to improvements in photoelastic instruments. More particularly, the invention relates to photoelastic instruments that are used to determine accurately the stresses in test models.

It is an object of the invention to provide an improved photoelastic instrument that may be used to determine accurately the stresses in test models.

Various kinds of photoelastic instruments have been known and used for some time. These instruments include polariscopes of various kinds and various types of compensators. Scientists have used these instruments to indicate the presence of stresses in test models. At first, the instruments could only be used to determine the existence of stresses qualitatively, but now the instruments can be used to determine stresses quantitatively. The present invention provides a novel photoelastic instrument that quantitatively determines the existence of stresses in a test model and does so quite accurately. The invention can do this because it provides a novel form of photoelastic instrument. This instrument uses a device to rotate the light. By providing an interferometer that has a light rotating device, it is possible to obtain an exceedingly accurate photoelastic instrument. It is, therefore, an object of the present invention to provide an interferometer having a light rotating action.

Various kinds of light rotators have been made and used, but none of them are accurate enough for use in an interferometer. To be useful in an interferometer, a light rotator must give rotation of light that is constant within one per cent over the whole field of view of the rotator.

Light rotating devices of two general types have been made. These are optical light rotators and magnetic light rotators. Although several of these have been made, no magnetic light rotator has been sufficiently accurate to be used successfully in an interferometer. Magnetic light rotating devices consist of a coil that induces a magnetic field in a core of transparent material. The core may be one of a number of different materials that have a magnetic optical rotational effect. The different materials have different Verdet's constants. An examination of a table of the various transparent materials which have a magneto-optical rotational effect indicates that the substances having a low Verdet's constant are usually stable and the substances having a high Verdet's constant are usually unstable or are slightly opaque. To be usable in a light rotator, a substance must have a relatively high Verdet's constant, and it should be stable. Many magnetic light rotators use carbon disulfide as the core because it has a fairly high Verdet's constant and is fairly stable. To secure a 45° rotation of light with carbon disulfide or any of the usual transparent cores, a coil that is several feet long or one carrying an excessive current would have to be used. Such a coil would have to give a magnetic field that was uniform along its radius and the coil would have to be kept cool. It would be exceedingly difficult if not absolutely impossible, to make such a coil. It is possible, however, to make a practical magnetic light rotator by treating a relatively unstable substance, that has a high rotational effect, to make it stable. Such a substance is mercuric potassium iodide which has a much higher Verdet's constant than carbon disulfide. This substance has heretofore not been used because it decomposes when subjected to light. By using a treated solution of this substance for the core of a magnetic light rotator, it is possible to make a practical magnetic light rotator.

The magnetic field of a magnetic light rotator will not have a constant strength radially. The center of the core will be subject to a magnetic field that has a strength different from the magnetic field at the edge of the core. The difference in the magnetic fields at the different parts of the core, will affect the rotation of the light. This is the result of the magneto-optical law that the strength of the magnetic field and the length of the path through the magnetic field determine the amount of rotation given. It is desirable to provide a number of co-axial paths through the core that have different effective light rotational lengths. The lengths of the co-axial paths are made so the product of the magnetic intensity for a particular path times the length of the particular path is equal to the product of the magnetic intensity of any other path times the effective length of the other path. Constant rotation of light over the entire field of the rotator can be attained in this way.

Other objects and advantages will appear from the drawings and accompanying description.

In the drawings and accompanying description, a preferred embodiment of the invention is shown and described, but it is to be understood that the drawings and accompanying description do not limit the invention and the invention will be defined by the appended claims.

Figure 1:
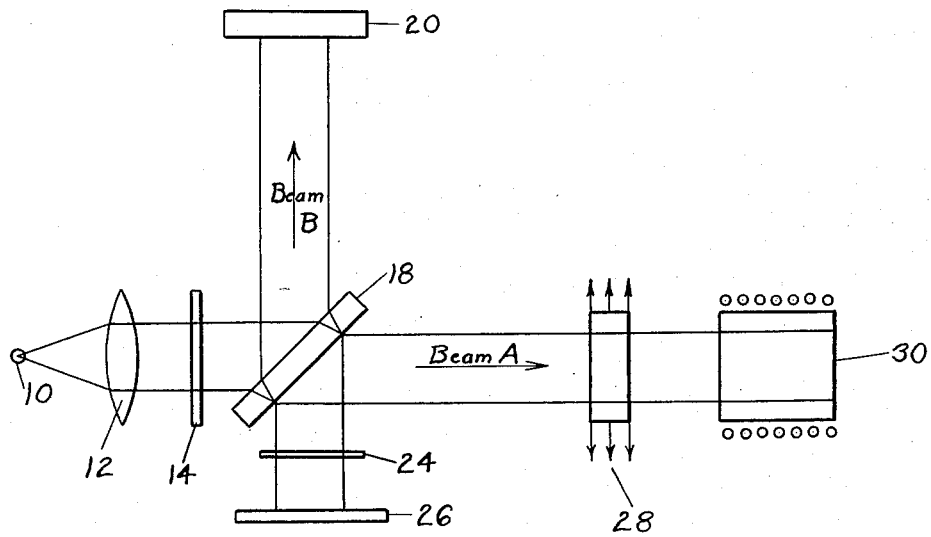
Fig. 1 is a schematic diagram of the photoelastic instrument when it is used as an interferometer.
Figure 2:
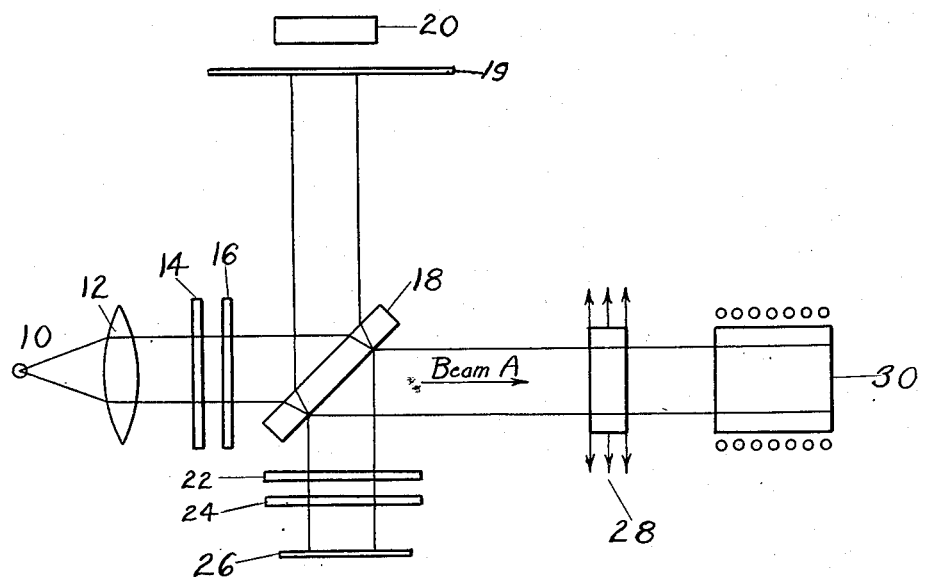
Fig. 2 is a schematic diagram of the photoelastic instrument when it is used as a polariscope.
Figure 3:
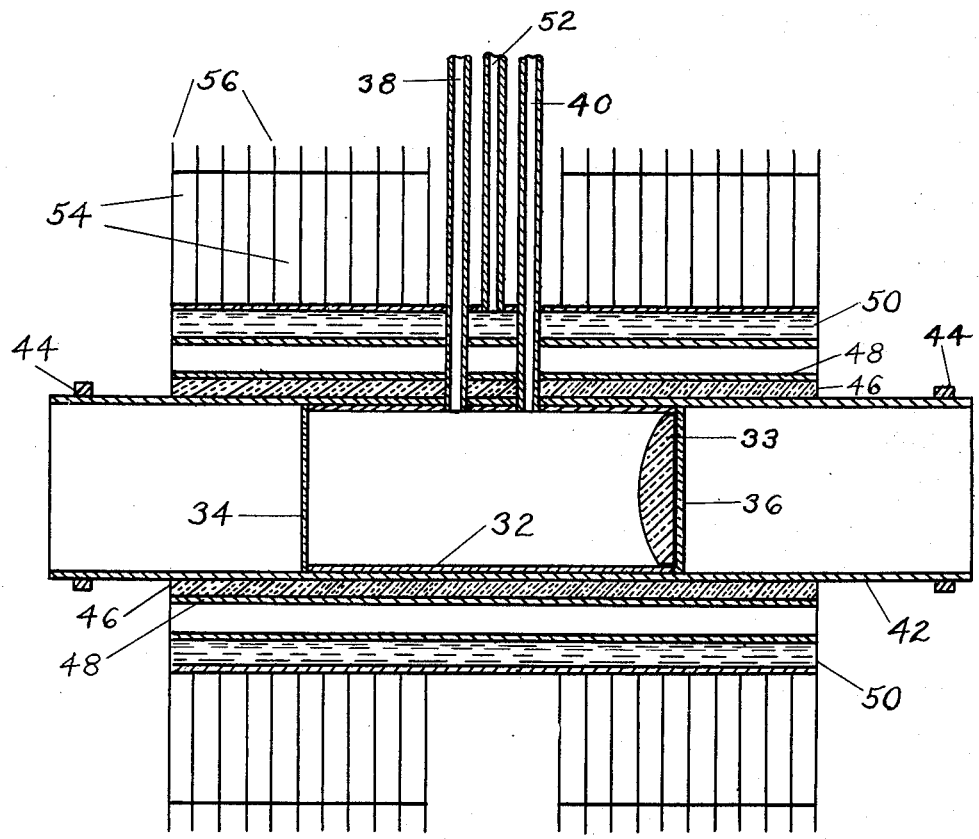
Fig. 3 is an enlarged cross-sectional view of a practical magnetic light rotator.

Referring to the drawings in detail, a source of light is denoted by the numeral 10. Positioned in proximity to the source of light 10 is a lens 12. A polarizer 14 is located near the lens 12 and is oppositely disposed with relation to the source of light 10. A quarter-wave plate 16 is removably positioned in proximity to the polarizer 14. A half-mirror 18 is positioned beyond the quarter-wave plate 16. A plane reflecting mirror is denoted by the numeral 20. A second quarter-wave plate is denoted by the numeral 22 and it is located in proximity to an analyzer 24 and a screen 26. A test model and a strain frame in which it is stressed, are denoted by the numeral 28. A magnetic light rotator is generally denoted by the numeral 30. This magnetic light rotator 30 generally consists of a tube of transparent liquid and a solenoid. The tube for the transparent liquid may be of any suitable design, but I prefer to use an enameled container 32 with glass ends 34 and 36. Where desired, the glass end 34 of the container may be coated with a quarter-wave film of barium stearate or otherwise treated to increase its transparency. A coating of barium stearate increases the light transmitting ability of the glass end 34 of the container 32, and eliminates "ghosts." The connection between the glass ends 34 and 36 and the enameled container 32 is tight enough to permit the container 32 to hold liquids. This liquid can be inserted into the container 32 through pipes 38 and 40. The glass end 36 of the container 32 is silvered to make the end 36 a mirror. The container 32 is mounted in a tube 42. This tube 42 is longer than the container 32 and is supported by end rings 44. The end rings 44 are supported by adjusting screws, not shown, that permit the accurate adjustment of the photoelastic instrument. The tube 42 is covered with heat insulating material 46 and this material is enclosed in an equalizing tube 48. A water jacket 50 encircles the equalizing tube 48, and is spaced therefrom a short distance to form an air space between the tube 48 and the jacket 50. Pipes 52 are connected to the water jacket 50 and permit water to be circulated through the jacket. A number of spirally wound solenoid coils 54 are supported on the water jacket 50. These coils 54 are separated from each other by fins 56 that contact the water jacket 50.

In the operation of the photoelastic instrument, two distinct procedures are followed. The first is the use of the instrument as an interferometer to obtain the isopachic lines and the second is the use of the instrument as a polariscope to obtain the isochromatic and isoclinic lines. Having obtained these lines, it is easy to calculate the stresses in the test model. When the instrument is used as an interferometer, the quarter-wave plates 16 and 22 are removed, and the magnetic light rotator 30 is actuated. The operation of the instrument as an interferometer is as follows:

The light source 10 emits monochromatic unpolarized light that passes through the lens 12 and is thereby rendered parallel. The parallel beam from 12 passes through a polarizer 14 and is thereby plane polarized. The plane polarized beam falls upon a half mirror 18 which has optically parallel faces. The half-mirror 18 divides the light beam into two beams A and B of equal intensity. One of these beams A, passes through a transparent model 28 that is held in a strain frame. This strain frame can be arranged to apply a given set of external forces to the model 28. These external forces induce a stress distribution in the model which can be quantitatively determined by the photoelastic instrument provided by the invention. The light vector $E_1$ of the beam A passing through a point of the test model 28 where the principal stresses are P and Q, is resolved by stress-induced double refraction into two plane polarized beams. One of these plane polarized beams which we denote by the letter $p$, has its light vector parallel to the principal stress P. The second of the two plane polarized beams which we shall denote by the letter $q$, has its light vector parallel to the principal stress Q. Since P and Q are at right angles, the two plane polarized beams $p$ and $q$ are at right angles to each other. The beam denoted by the letter $p$ and the beam denoted by the letter $q$, proceed through the model 28 and suffer alterations in their optical paths due to two causes. First, the refractive index $\mu$ of the model is altered by the stresses P and Q. This effect is given by the stress-optic law $$\left.\begin{array}{l}\mu_P-\mu=C_1P+C_2Q\\ \mu_Q-\mu=C_1Q+C_2P\end{array}\right\} \quad \text{Equations 1}$$

where $C_1$ and $C_2$ are constants. Second, the principal stresses P and Q change the thickness of the test model 28 in accordance with the elastice law $$\delta t = -(P+Q)\frac{\nu}{E}t \quad \text{Equation 2}$$

where $\delta t$ is the change in thickness $t$, $\nu$ is Poissons ratio, and E is Young's modulus. The respective changes in optical paths as compared with path $\mu t$ through the unstressed model are:

$$\left.\begin{array}{l}\delta S_P = \mu_P(t+\delta t)-\mu t\\ \delta S_Q = \mu_Q(t+\delta t)-\mu t\end{array}\right\} \quad \text{Equations 3}$$

From Equations 1, 2, and 3, we have $$\left.\begin{array}{l}\delta S_P=(C_1P+C_2Q)t-(\mu+C_1P+C_2Q)(P+Q)\frac{\nu}{E}t\\ \delta S_Q=(C_1Q+C_2P)t-(\mu+C_1Q+C_2P)(P+Q)\frac{\nu}{E}t\end{array}\right\}$$

Equations 4

This last equation expresses the changes in the optical paths for the beams $p$ and $q$ in terms of the stresses P and Q. After traversing the model 28, the beams $p$ and $q$ pass into the light rotator 30. During their initial passage through the rotator 30, the beams are rotated 45° in the direction in which the positive current flows in the coil. At the end of the rotator is a silvered plate 36 that reflects the beams $p$ and $q$. The reflected beams will pass back through the rotator and will be rotated an additional 45°. Thus beams $p$ and $q$ return to the model 28 with a 90° rotation of their light vectors. In passing through the model 28 after rotation, the roles of the beams $p$ and $q$ are interchanged. The beam $p$ suffers the retardation $\delta S_Q$ in its optical path and the beam $q$ suffers a retardation $\delta S_P$. Upon emerging from the model after rotation, both beams $p$ and $q$ have the same optical retardation, $$\delta S = \delta S_P + \delta S_Q = \left(C_1 + C_2 - \frac{2\mu\nu}{E}\right)(P+Q)t - (C_1+C_2)(P+Q)^2\frac{\nu}{E}t \quad \text{Equation 5}$$

In particular the beams $p$ and $q$ have no relative optic rotation. Hence the beams $p$ and $q$ recombine into a light vector $E_1^1$ at right angles to the original direction of the light vector $E_1$. In this manner all the light that emerges after its second passage through the model 28 is rotated at 90° to the original direction, regardless of the orientation of P and Q. A calculation of the two terms in the preceding equation, Equation 5, from known experimental data for Bakelite, shows that the second term is of the order of 0.005 times the first. Neglecting the small term, we have to a high precision $$\delta S = \left(C_1 + C_2 - \frac{2\mu\nu}{E}\right)(P+Q)t \quad \text{Equation 6}$$

Bakelite was used as being representative of the synthetic resins commonly used in making the test models in photoelastic work. The above equation, Equation 6, gives, relative to the optical path through the unstressed model, just that change in path which is produced by the stresses P and Q. The reflected beam A that emerges from the test model 28 after being rotated, strikes the half-mirror 18 where one-half of the beam passes through and is lost and the other half is reflected to a screen or photographic plate 26. The other half of the light from the light source 10 that strikes half-mirror 18 is reflected by the half-mirror. This light is designated as beam B and it contacts a mirror 20 and is reflected back to the half-mirror 18 where half of it is lost by reflection and the other half passes through. The half that passes through half-mirror 18 enters analyzer 24 which is interposed between the half-mirror 18 and the screen 26. Because the light vector $E_1^1$ and $E_2$ of corresponding parts of the beams A and B are at right angles to each other, they will not ordinarily interfere. To produce interference, however, we interpose the analyzer 24 between half-mirror 18 and screen 26 which has its axis at 45° to the light vectors of the beams A and B. The analyzer 24 permits only those components to pass that are parallel to the axis of the analyzer. Those parts of the beams A and B that are directed toward the screen 26, have parallel light vectors and are in proper condition to interfere. Any difference in optical paths between beams A and B when beam A passes through the unstressed model can be ignored since interference upon the screen 26 due to such difference in optical paths, would produce a uniform effect all over the screen if the interferometer is adjusted properly. It then appears that $\delta S$ of Equation 6 is the only part of the path difference between corresponding parts of the beams A and B that needs to be taken into account. This path difference $\delta S$ is due entirely to the effect of the stress sum P plus Q. If the interferometer is initially adjusted with the model 28 unstressed to a uniform extinction over the whole screen 26, it follows that complete extinction occurs for all points of the stress model for which $\delta S$ is an integral multiple of the wave length $\lambda$ of the light. For points of the model 28 where $\delta$ is an odd multiple of $\lambda/2$, the corresponding parts of beams A and B reinforce each other on screen 26. Thus the screen or photographic plate 26 will show a set of alternating bright and dark interference fringes. Lines may, of course, be interpolated between any two dark fringes corresponding to any values of fringe wanted. Hence if we set $$\delta S = m\frac{\lambda}{2} \quad \text{Equation 7}$$

whatever the value of $m$, we have, upon combining with Equation 6, the important result, $P+Q=Im$, where I is a constant which may appropriately be called the isopachic fringe constant. The isopachic constant I is, in fact, given by $$I = \frac{\lambda}{\left(C_1 + C_2 - \frac{2\mu\nu}{E}\right)t}$$

although this is of little importance since I can be measured for a given material, a given thickness $t$, and a given wave length $\lambda$ by an obvious tension test. The important point here is that the instrument provided by the invention reduces the problem of finding the stress sum $P+Q$, at any point of the model to the mere counting of fringe order. This is easily done by watching the formation of the fringe path as the stresses are applied to the model. For a Bakelite model .25 inch thick, the isopachic fringe constant I turns out to be, for the double passage of light through the model, about 85 pounds per square inch per fringe.

The second operation of the instrument is its use as a polariscope to give the isochromatic and isoclinic lines. Only beam A is needed for the polariscope and beam B that is reflected from the half-mirror 18 may be absorbed on a black screen 19 interposed between mirror 20 and half-mirror 18. As in the case of the interferometer, the light from the light source 10 passes through lens 12 and is rendered parallel. This parallel beam passes through polarizer 14 and is thereby made plane polarized. The beam then passes through a quarter-wave plate 16, the axis of which is set at 45° to the plane of polarization. The quarter-wave plate 16 circularly polarizes the light and this light passes through the half-mirror 18 to the model 28. The passage of the beam A through the model 28 produces the two beams $p$ and $q$ whose path differences are given by Equation 4. When the instrument is used as a polariscope, the rotator is not actuated and the light entering the rotator is reflected back without rotation. When the light passes back through the model 28, the relative path differences are doubled instead of being equalized as in the case of the interferometer. The beams $p$ and $q$ proceed to the half-mirror 18 where half of each of them is lost and the other half is reflected downward. This reflected light passes through a second quarter-wave plate 22 that converts each beam into a plane polarized beam. The plane polarized beam passes through the analyzer 24 that is crossed with polarizer 14. Since the analyzer 24 transmits only those components of beams $p$ and $q$ which have light vectors parallel to the axis of the analyzer 24, the portions of the beams $p$ and $q$ which strike screen 26 are in condition to interfere. The path difference between these two interfering beams $p$ and $q$ is twice the difference $\delta S_P - \delta S_Q$ between the values given in Equation 4, namely, $$\delta S = 2(\delta S_P - \delta S_Q) = 2(C_1 - C_2)(P - Q)t - 2(C_1 - C_2)(P^2 - Q^2)\frac{\nu}{E}t$$

In the last, the second term on the right is of order .002 times the first, and hence negligible. To a high precision then $$\delta S = 2(C_1 - C_2)(P - Q)t$$

Reasoning as before, we see that alternate bright and dark fringes will be cast upon a screen. When $\delta S = n\lambda$, where $n$ is a whole number, we have a dark fringe. When $n$ is of the form $2k+1$, where $k$ is a whole number, we have a bright fringe. For all values of $n$ then we have upon combining $\delta S = n\lambda$ with Equation 9, $$P - Q = Kn$$

where $$K = \frac{\lambda}{2(C_1 - C_2)t}$$

is a constant called the isochromatic fringe constant. Since $K$ may be readily found by simple experiments such as tension or bending tests, the last equation reduces the determination of $P-Q$ at any point of a plane model 28 to the mere operation of counting fringes. The isochromatic fringe constant $K$ for a direct transmission polariscope is about 300 psi per fringe for a ¼ inch model of Bakelite. For the present reflection type polariscope, the corresponding value of $K$ is about 150 since the light passes twice through the model. Assuming an accuracy of a tenth fringe for ordinary inspection, the present polariscope appears to be accurate to about 15 pounds per square inch for ¼ inch thickness of model.

It is possible to remove the quarter-wave plates 16 and 22 from the instrument and thereby bring into evidence the isoclinic lines superimposed upon the isochromatic lines. From the theory of isoclinic lines one may find the directions of the principal stresses at each point of the model.

The magneto-optic rotator operates according to the magneto-optic law discovered by Michael Faraday. The light rotation may be expressed by the equation $\theta = VHL$ where $\theta$ is the angle through which the light vector is rotated while traversing a length L in a transparent medium along a magnetic field H, and where V is a constant called Verdet's constant. Light rotators of many different kinds and designs have been made that use this effect, but none of them have been able to give the accurate high degree rotation needed in an interferometer. This is largely due to the employment in these light rotators of transparent cores having a low Verdet's constant. The advantage of cores of this type is that they are usually stable substances. Other substances are known that have a higher rotational effect but these substances are either unstable or semi-opaque. One such substance is mercuric potassium iodide. This substance has a high rotational effect but it is unstable and decomposes on exposure to light. By adding small quantities of a suitable compound, it is possible to utilize this substance in a magnetic light rotator. By using this substance, a light rotator of small proportions can be used. The small proportions are exceedingly important because the magnetic field should be constant and the temperature of the rotator should be low. If the temperature of the rotator rises appreciably, a thermosiphon effect will occur in the solution and will introduce errors into the operation of the device. It is possible to make mercuric potassium iodide a stable compound by adding from 1/10 to ½ of 1 per cent sodium carbonate to the solution. Sodium carbonate acts as a reducing and stabilizing agent and makes the solution stable because it prevents the oxidation that usually results in decomposition of the solution. Sodium carbonate is only one of a number of reducing agents that act as stabilizers and could be used. The magnetic intensity in the core is probably not uniform over the cross-section of the coil. Since the light rotational effect is dependent upon the strength of the magnetic field and the length of the path, a difference in the magnetic intensity must be accompanied by a difference in the length of the path to obtain uniform rotation over the whole field of the rotator. This is done by inserting a suitable lens 33 of transparent material in the condenser 32. This lens 33 has a relatively low light rotational effect and has the same index of refraction as the solution. The lens 33 is curved to change the length of the path through the mercuric potassium iodide. The curvature of the lens 33 is to insure the provision of coaxial paths that make the light rotation constant over the whole field of the magnetic light rotator. The curvature of the lens can be determined accurately by experimentation and calculation to make the product of the strength of the magnetic intensity times the length of the path through the mercuric potassium iodide equal throughout the entire cross-sectional area of the rotator. This assures constant rotation of the light. The lens shown is believed to be usable but a concave lens may be needed. The curvature and dimensions of this lens can be determined scientifically.

Where a test model is stressed, the surface of the model may be inclined sufficiently to cause the surface to change the direction of the light as it passes through the model. This light, the direction of which has been changed, will be rotated and will return to the test model but it will not enter the model at the exact point it left. This results in errors. The same result is had where the model is not polished finely and these errors are quite objectionable. By submerging the test model in a solution which has the same index of refraction, it is possible to obviate all of these errors. Furthermore, it is possible to obviate a great deal of the polishing formerly thought necessary.

This magnetic light rotator is described and claimed in copending application Serial No. 485,962, filed May 5, 1943, by Alexander L. Duval d'Adrian and myself.

By the use of this invention, a photoelastic instrument may be made that accurately determines the stress in test models.

Although only a preferred form of the invention has been shown and described in the drawings and accompanying description, it is obvious to those skilled in the art that various changes may be made in the form of the invention without affecting the scope of the invention.

What I claim is:

1. A photoelastic instrument adapted for use as an interferometer comprising a source of light, a lens to render a portion of the light rays from the said source parallel to each other, a polarizer to plane polarize the light passing therethrough, an optical half-mirror that transmits one-half of the light striking it and reflects the other half, a plane mirror positioned to receive a portion of the light from said half-mirror, a stress frame to receive a test model and impress stresses thereon, a plurality of means that are adapted to receive a portion of the light from the half-mirror and to cause a ninety degree rotation of the plane of polarization of the light and to return the light to the said half-mirror, an analyzer adapted to cause an interference of the beams of light passing therethrough from said half-mirror, and a screen, said polarizer being positioned between said source of light and said half-mirror, said stress frame being positioned between said half-mirror and said means, and said analyzer being positioned between said half-mirror and said screen.

2. A photoelastic instrument adapted for use as an interferometer comprising a source of light, a polarizer, an optical half-mirror that transmits a portion of the light striking it and reflects the rest of the light, a plane mirror positioned to receive a portion of the light from said half-mirror, a stress frame to receive a test model and impress stresses thereon, means to receive a portion of the light from the half-mirror and cause a ninety degree rotation of the plane of polarization of the light and return the light to the half-mirror, an analyzer that is adapted to cause interference of the beams of light passing therethrough from said half-mirror, and a screen, said polarizer being positioned between said source of light and said half-mirror, said stress frame being positioned between said half-mirror and said means, and said analyzer being positioned between said half-mirror and said screen.

3. A photoelastic instrument adapted for use as an interferometer comprising a source of light, a polarizer, an optical half-mirror that transmits a portion of the light striking it and reflects the rest of the light, a plane mirror to receive a portion of the light from the half-mirror and reflect it back to the half-mirror, a stress frame to receive a test model and impress stresses thereon, means including a magneto-optic light rotator that receives the rest of the light from the half-mirror and rotates its plane of polarization ninety degrees and sends it back through the test model to the half-mirror, an analyzer adapted to cause interference of the beams of light passing therethrough from said half-mirror, and a screen, said polarizer being positioned between said source of light and said half-mirror, said stress frame being positioned between said half-mirror and said means, and said analyzer being positioned between said half-mirror and said screen.

4. A photoelastic instrument adapted for use as an interferometer comprising a source of light, a polarizer, an optical half-mirror that transmits a portion of the light striking it and reflects the rest of the light, a plane mirror to receive a portion of the light from the half-mirror and reflect it back to the half-mirror, a stress frame to receive a test model and impress stresses thereon, a magneto-optic light rotator that receives the rest of the light from the half-mirror after the light passes through the test model, said magneto-optic light rotator being arranged to rotate the plane of polarization of the light forty-five degrees and to permit the light to contact a plane mirror and be reflected back and to rotate the plane of polarization of the light an additional forty-five degrees so that the light enters the test model at the same place where it emerged but the light is moving in the opposite direction and has been rotated ninety degrees, a second polarizer adapted to cause interference of the beams of light passing therethrough from said half-mirror, and a screen, said first polarizer being positioned between the source of light and said half-mirror, said stress frame being positioned between said half-mirror and said rotator, and said second polarizer being positioned between said half-mirror and said screen.

5. A photoelastic instrument adapted for use as an interferometer or a polariscope comprising a source of monochromatic unpolarized light, a lens to render a portion of the light rays from the said source parallel to each other, a polarizer to plane polarize the light passing therethrough, a removable quarter wave plate that circularly polarizes the light passing therethrough, an optical half mirror that transmits one-half of the light striking it and reflects the rest of the light, said half-mirror forming two beams of light, a plane mirror to receive one beam of light from the half-mirror and reflect it back, a light-absorbing screen adapted to be removably positioned between the plane mirror and half-mirror, means including a light rotating device that is adapted to receive the other beam of light from the half-mirror after it has passed through a transparent test model and rotate the light and direct it back to said half-mirror, said light rotating device being arranged to rotate the plane of polarization of the light ninety degrees, a second removable quarter wave plate, a second polarizer adapted to cause interference of the beam of light passing therethrough from said half-mirror, and a screen, said first polarizer and said first quarter wave plate being positioned between said source of light and said half-mirror, said second quarter wave plate and said second polarizer being positioned between said half-mirror and said screen.

6. A photoelastic instrument adapted for use as an interferometer or a polariscope comprising a source of light, a lens to render a portion of the light rays from the said source parallel to each other, a polarizer to plane polarize the light passing therethrough, a removable means that circularly polarizes the light passing therethrough, a means that transmits a portion of the light striking it and reflects the rest of the light, said light transmitting and reflecting means forming two beams of light, a reflecting means that receives one beam of light from said light transmitting and reflecting means and reflects it back, a light absorber adapted to be removably positioned between the reflecting means and the light transmitting and reflecting means, means including a light rotator and means to render said rotator inoperative that is arranged to receive the other beam of light from said light transmitting and reflecting means and cause a ninety degree rotation of the plane of polarization of the light and direct the light back to said light transmitting and reflecting means, a second removable means that circularly polarizes the light passing therethrough, a second polarizer adapted to cause interference of the beams of light passing therethrough from said light transmitting and reflecting means, and a viewing means, said first polarizer and said first circular polarizing means being positioned between said source of light and said light transmitting and reflecting means, said second circular polarizing means and said second polarizer being positioned between said light transmitting and reflecting means and said viewing means.

7. A photoelastic instrument adapted for use as an interferometer comprising a source of light, a polarizer, means that transmits a portion of the light striking it and reflects the rest of the light, a reflecting means positioned to receive a portion of the light from said light transmitting and reflecting means and to reflect it back, a stress frame to receive a test model and impress stresses thereon, reflecting means and a light rotator that are arranged to receive a portion of the light from said light transmitting and reflecting means and cause a ninety degree rotation of the plane of polarization of the light and return the light to said light transmitting and reflecting means, means to cause interference of the beams of light passing therethrough from said light transmitting and reflecting means, and a viewer, said source of light and said light transmitting and reflecting means being positioned so said polarizer is between them, said stress frame being positioned to intercept the rotated light, and said viewer and said light transmitting and reflecting means being positioned so said interference-causing means is between them.

8. A photoelastic instrument adapted for use as an interferometer or a polariscope comprising a source of monochromatic unpolarized light, a lens to render a portion of the light rays from the said source parallel to each other, a polarizer to plane polarize the light passing therethrough, a removable quarter wave plate that circularly polarizes the light passing therethrough, an optical half-mirror that transmits one-half of the light striking it and reflects the other half, a plane mirror positioned to receive a portion of the light from said half-mirror, a light-absorbing screen removably positioned between said plane mirror and said half-mirror, a strain frame to receive a test model and impress stresses thereon, means operable to intercept a portion of the light from said half-mirror and rotate its plane of polarization forty-five degrees and means to reflect the intercepted and rotated light back through the rotating means where its plane of polarization will be rotated an additional forty-five degrees, a second removable quarter wave plate, an analyzer adapted to cause interference of the beams of light passing therethrough from said half-mirror, and a screen said polarizer and said first quarter wave plate being positioned between said source of light and said half-mirror, said strain frame being positioned between said half-mirror and said light rotating means, and said second quarter wave plate and said analyzer being positioned between said half-mirror and said screen.

9. A photoelastic instrument adapted for use as an interferometer or as a polariscope comprising a source of monochromatic unpolarized light, a lens to render a portion of the rays from the source of light parallel to each other, a polarizer to polarize the light passing therethrough, said polarizer and said source of light being oppositely disposed relative to the lens, a removable quarter wave plate that circularly polarizes the light passing therethrough, said quarter wave plate and said lens being oppositely disposed relative to the polarizer, an optical half-mirror that transmits one-half of the light striking it and reflects the rest of the light, a plane mirror positioned to receive a portion of the light from the half-mirror, a light-absorbing screen removably positioned between said half-mirror and said plane mirror, a strain frame to receive a test model and impress stresses thereon, means including a light rotator and means to render said rotator inoperative that is adapted to receive light that passes through the test model and to change the direction of the light one hundred and eighty degrees, said means also being adapted to rotate the plane of polarization of the light ninety degrees when the rotator is used, a second removable quarter wave plate, a second polarizer adapted to cause interference of the beams of light passing therethrough from said half-mirror, and a screen, said strain frame being positioned between said half-mirror and said means, and said second polarizer being positioned between said half-mirror and said screen.

FRANK W. BUBB.